US012776875B2

(12) United States Patent
Gao

(10) Patent No.: US 12,776,875 B2
(45) Date of Patent: Oct. 27, 2026

(54) METHOD FOR TRIGGERING SOUNDING REFERENCE SIGNAL (SRS) USED FOR ANTENNA SWITCHING AND DEVICE THEREOF

(71) Applicant: Beijing Xiaomi Mobile Software Co., Ltd., Beijing (CN)

(72) Inventor: Xueyuan Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 286 days.

(21) Appl. No.: 18/692,117

(22) PCT Filed: Sep. 15, 2021

(86) PCT No.: PCT/CN2021/118621

§ 371 (c)(1),
(2) Date: Mar. 14, 2024

(87) PCT Pub. No.: WO2023/039770

PCT Pub. Date: Mar. 23, 2023

(65) Prior Publication Data

US 2025/0080294 A1 Mar. 6, 2025

(51) Int. Cl.
*H04L 5/00* (2006.01)
*H04B 7/06* (2006.01)
*H04W 72/231* (2023.01)

(52) U.S. Cl.
CPC ......... *H04L 5/0048* (2013.01); *H04B 7/0608* (2013.01); *H04W 72/231* (2023.01)

(58) Field of Classification Search
CPC ... H04L 5/0048; H04L 5/0023; H04L 5/0051; H04L 5/0091; H04L 5/0094; H04L 5/00;
(Continued)

(56) References Cited

U.S. PATENT DOCUMENTS

2019/0281588 A1 9/2019 Zhang et al.
2019/0356445 A1* 11/2019 Manolakos ........... H04L 5/0048
(Continued)

FOREIGN PATENT DOCUMENTS

CN 111464275 A 7/2020
CN 112564871 A 3/2021
(Continued)

OTHER PUBLICATIONS

Combined Chinese Office Action and Search Report issued Sep. 29, 2025 in Chinese Patent Application No. 202180002855.6 (with English translation of Office Action only), citing document 1 therein, 15 pages.

(Continued)

*Primary Examiner* — Mohamed A Kamara
(74) *Attorney, Agent, or Firm* — Oblon, McClelland, Maier & Neustadt, L.L.P.

(57) ABSTRACT

The present disclosure provides a method for triggering a sounding reference signal (SRS) for antenna switching and a device thereof. The method can be applied to a 5G NR system. The method includes a network device receiving capability reporting information, which is sent by a terminal device, wherein the capability reporting information is configured for representing an antenna switching configuration combination supported by the terminal device; and the network device configuring, for the terminal device, in the supported antenna switching configuration combination and according to the capability reporting information, an SRS resource suitable for at least one usage, wherein the at least one usage includes antenna switching.

20 Claims, 3 Drawing Sheets

(58) Field of Classification Search
CPC .. H04B 7/0608; H04B 7/0404; H04B 7/0413; H04B 7/0691; H04B 7/04; H04B 7/06; H04B 7/08; H04W 72/04; H04W 72/231; H04W 8/24
See application file for complete search history.

(56) References Cited

U.S. PATENT DOCUMENTS

| | | | | |
|---|---|---|---|---|
| 2022/0337373 | A1* | 10/2022 | Wu | H04L 5/0048 |
| 2023/0045308 | A1* | 2/2023 | Guan | H04B 7/0608 |
| 2023/0047048 | A1* | 2/2023 | Liu | H04B 7/0417 |
| 2023/0275730 | A1* | 8/2023 | Go | H04L 5/0048 370/329 |
| 2023/0403118 | A1* | 12/2023 | Xiao | H04B 7/0456 |

FOREIGN PATENT DOCUMENTS

| | | | |
|---|---|---|---|
| CN | 112953606 | A | 6/2021 |
| WO | WO 2021/005764 | A1 | 1/2021 |
| WO | WO 2021/163937 | A1 | 8/2021 |

OTHER PUBLICATIONS

International Search Report mailed on Jun. 1, 2022 in PCT/CN2021/118621 filed on Sep. 15, 2021, citing references 15-19 therein, 4 pages (with English Translation).

* cited by examiner

METHOD FOR TRIGGERING SOUNDING REFERENCE SIGNAL (SRS) USED FOR ANTENNA SWITCHING AND DEVICE THEREOF

CROSS REFERENCE TO RELATED APPLICATIONS

The present disclosure is the U.S. national phase application of International Application No. PCT/CN2021/118621 filed on Sep. 15, 2021, the content of which is incorporated herein by reference in its entirety for all purposes.

BACKGROUND

Technical Field

The present disclosure relates to the field of communication technology, in particular to a method for triggering a sounding reference signal (SRS) used for antenna switching and a device thereof.

Description of the Related Art

In the 5th Generation (5G) mobile communication system, a terminal device supports an SRS (Sounding Reference Signal) for SRS antenna switching, and the SRS antenna switching includes 1T2R, 2T4R, 1T4R or a pattern where T=R. The SRS can be divided as periodic SRS, semi-persistent SRS, and aperiodic SRS depending on different SRS transmission cycles. The SRS antenna switching is suitable for scenarios with reciprocal uplink and downlink, and is used for the network device to obtain downlink channel information.

SUMMARY

In the first aspect, the present disclosure provides a method for triggering a sounding reference signal (SRS) used for antenna switching, which is performed by a network device. The method includes receiving capability reporting information sent by a terminal device. The capability reporting information is configured to represent an antenna switching configuration combination supported by the terminal device, configuring, in the antenna switching configuration combination supported by the terminal device, an SRS resource suitable for at least one usage. The at least one usage includes antenna switching, and sending, based on the capability reporting information, SRS resource configuration information to the terminal device, wherein the SRS resource configuration information comprises information for activating the SRS resource used for uplink SRS.

In the second aspect, the present disclosure provides a method for triggering a sounding reference signal (SRS) used for antenna switching, which is performed by a terminal device. The method includes sending capability reporting information to a network device. The capability reporting information is configured to represent an antenna switching configuration combination supported by the terminal device, receiving SRS resource configuration information sent by the network device based on the capability reporting information. The SRS resource configuration information comprises information for activating an SRS resource used for uplink SRS; and sending, based on the SRS resource configuration information and the capability reporting information, uplink SRS to the network device.

In the third aspect, the present disclosure provides a communication device including a processor and a memory for storing a computer program. The processor is configured to execute the computer program stored in the memory to cause the method described in the first aspect to be implemented.

In the fourth aspect, the present disclosure provides a communication device including a processor and a memory for storing a computer program. The processor is configured to execute the computer program stored in the memory to cause the method described in the second aspect to be implemented.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
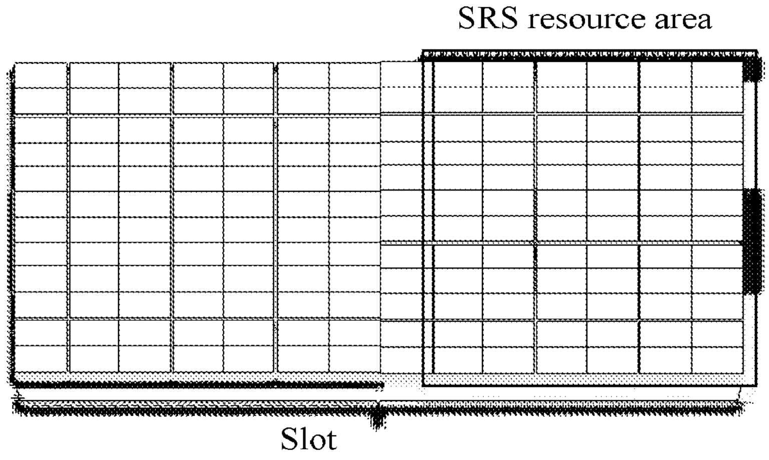
FIG. 1 is a schematic diagram of an SRS mapping domain within a time slot.

Referring now to the drawings, wherein like reference numerals designate identical or corresponding parts throughout the several views.

Embodiments of the present disclosure will be described in the following in detail, examples of which are shown in the drawings, where the same or similar reference numerals throughout the disclosure represent the same or similar components or parts with same or similar functions. Embodiments described in the following with reference to the drawings are exemplary and are intended to be used to explain the present disclosure, but cannot be understood as limiting the present disclosure. In the description of the present disclosure, unless otherwise specified, "/" means "or". For example, A/B can represent A or B. "And/or" in the present disclosure is only used for description of an association relationship between associated objects, which indicates that there can be three types of relationships. For example, A and/or B can represent A alone, both A and B, and B alone.

It should be noted that "SRS resource configuration" in present disclosure refers to SRS resource parameter values configured by a network device, with which a terminal device complies. "SRS triggering" refers to an action of the network device, through which the network device transmitting the SRS resource parameter values configured by the network device to the terminal device through control signaling.

In the 5G NR system, the uplink SRS can be periodic, semi-persistent, or aperiodic SRS, and the uplink SRS can be of narrowband or broadband, single-port or multi-port. The uplink SRS parameter can be configured by the network device and sent to the terminal device, including the number of ports, the frequency domain resource position, the time domain resource position, the sequence, the sequence cyclic shift, etc. As shown in FIG. 1, in the 5G NR system, the SRS is mapped on up to six symbols in an uplink time slot. For example, the network device can configure multiple uplink SRS sets for the terminal device, with each resource set containing one or more SRS resources. An SRS resource can occupy N consecutive OFDM (Orthogonal Frequency Division Multiplexing) symbols, where N can be 1, 2, and 4.

It can be understood that the NR system supports the gNB (base station) side to obtain downlink channel information through channel reciprocity to improve downlink data transmission performance. In order to support the gNB to effectively obtain the downlink information through the channel reciprocity under various terminal capabilities of transmitting and receiving, the NR system has specially designed the reference signal SRS. At present, the terminal capability of transmitting and receiving defined in R15/16 can be divided into two categories, namely one category with the same number of transmit and receive antennas (T=R) and another category with more receive antennas than transmit antennas (R>T). The category with the same number of transmit and receive antennas mainly includes one transmit antenna and one receive antenna (1T1R), two transmit antennas and two receive antennas (2T2R), and four transmit antennas and four receive antennas (4T4R). The category with more receive antennas than transmit antennas mainly includes one transmit antenna and two receive antennas (1T2R), one transmit antenna and four receive antennas (1T4R), and two transmit antennas and four receive antennas (2T4R).

For different antenna configurations, the SRS resource configurations also varies. Several cases are given in the following.

1) For the terminal with the same number of transmit and receive antennas (T=R), the gNB can configure two SRS resource sets at most. Each set includes only one SRS resource, the number of ports of which is equal to the number of transmit antennas of the terminal. One of the two SRS resource sets can be configured as periodic, and the other can be configured as aperiodic.
2) For the terminal with one transmit antenna and two receive antennas (1T2R), the gNB can configure two SRS resource sets at most. Each set includes two SRS resources and each SRS resource has one port only.
3) For the terminal with two transmit antennas and four receive antennas (2T4R), the gNB can configure two SRS resource sets at most. Each set includes two SRS resources and each SRS resource has two ports.
4) For the terminal with one transmit antenna and four receive antennas (1T4R), special considerations are required when the gNB performs the SRS resource configuration. For periodic or semi-persistent SRS resources, a maximum of only one resource set can be configured, the resource set includes four SRS resources, and each SRS resource has one port. For aperiodic SRS resources, a maximum of two SRS resource sets can be configured, the two SRS resource sets include four SRS resources in total, these four resources are transmitted in two slots and are sent through different physical antennas. The two resource sets can be configured with two resources each, or one resource set includes one resource and the other resource set includes three resources, with each resource having only one port.

The network device (such as the base station) generally configures SRS resources for the terminal based on the UE capability reported by the terminal device. The UE capabilities supported by the terminals in different releases will also vary. For example, the UE capabilities supported by the terminal in release R15 include t1r2, t1r4, t2r4, t1r4-t2r4, t1r1, t2r2, t4r4, and the UE capabilities supported by the terminal in release R16 include t1r1-t1r2, t1r1-t1r2-t1r4, t1r1-t1r2-t2r2-t2r4, t1r1-t1r2-t2r2-t1r4-t2r4, t1r1-t2r2, t1r1-t2r2-t4r4.

In the release R17 research currently, there is a need to further increase the number of antennas of the terminal device. The number of antennas will be accordingly further increased to a maximum of 6 or 8. The typical antenna configurations currently defined are {1T6R, 1T8R, 2T6R, 2T8R, [4T6R], 4T8R}, as shown in Table 1 below.

TABLE 1

SRS antenna switching configuration combinations up to 8 antennas

| Tx\Rx | 6Rx | 8Rx |
|---|---|---|
| 1T | 1T6R | 1T8R |
| 2T | 2T6R | 2T8R |
| 4T | 4T6R | 4T8R |

In order to adapt to the current business or scenario, the terminal device may need to change its antenna configuration, where, for example, the antenna configuration is degraded from 2T4R to 1T4R or 2T2R, or changed from 2T2R to 4T4R. In this case, it is necessary to use different SRS resource configurations suitable for "antenna switching", for obtaining downlink CSI.

In the SRS enhancement in release R17, the number of antennas will increase to 6/8 Rx, and the antenna switching supports more scenarios, with more complex SRS configurations corresponding to.

When the number of antennas in the terminal device increases, one SRS configuration used for antenna switching may need to contain up to 4 SRS resource sets, the current SRS triggering request contains 3 codepoints, and the SRS triggering for other usages such as "codebook", "non-codebook", and "beam management" also needs to be considered.

Release R15/16 does not support flexible and dynamic antenna switching configurations within BWP. The triggering becomes more complex after a dynamic antenna switching configuration scheme is introduced. Therefore, it is necessary to develop a relevant method for triggering the SRS used for multiple usages (including antenna switching).

Embodiments of the present disclosure provide a method for triggering a sounding reference signal (SRS) for antenna switching. In order to better understand the method for triggering the sounding reference signal (SRS) for antenna switching disclosed in the present disclosure, a communication system used in embodiments of the present disclosure will be described first in the following.

Figure 2:
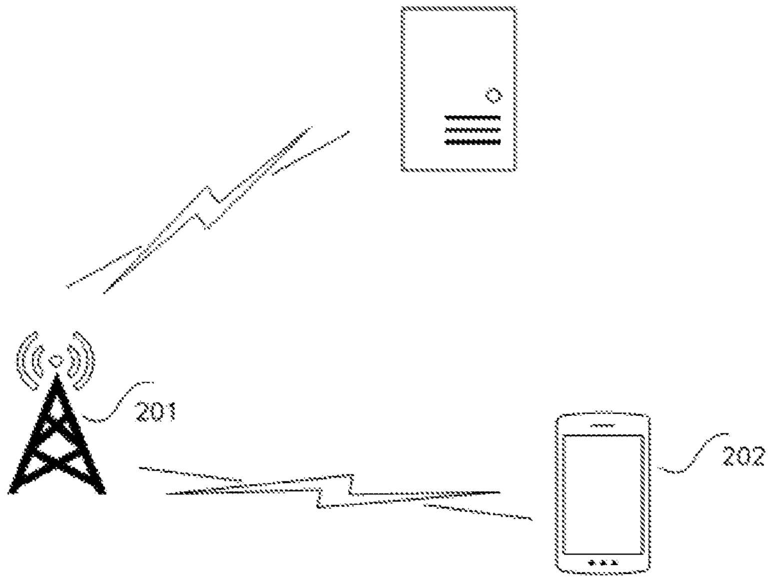
FIG. 2 is a schematic diagram of an architecture of a communication system according to embodiments of the present disclosure.

Reference is made to FIG. 2, which illustrates a schematic diagram of an architecture of a communication system according to embodiments of the present disclosure. The communication system can include, but is not limited to, one terminal device and one network device. The number and forms of devices shown in FIG. 2 are for example only and do not constitute a limitation on embodiments of the present disclosure. In practical applications, two or more terminal devices and two or more network devices can be included. The communication system shown in FIG. 2 includes a network device 201 and a terminal device 202 as an example.

It should be noted that technical solutions provided in embodiments of the present disclosure can be applied to various communication systems, such as the Long Term Evolution (LTE) system, the 5th generation (5G) mobile communication system, the 5G new radio (NR) system, or other new mobile communication systems in the future.

The network device 201 in embodiments of the present disclosure is an entity on the network side for transmitting or receiving signals. For example, the network device 201 can be an evolved NodeB (eNB), a transmission reception point (TRP), a next generation NodeB (gNB) in the NR system, a base station in other future mobile communication systems, or an access node in wireless fidelity (WiFi) systems. Embodiments of the present disclosure do not limit the specific technology and device form adopted by the network device. The network device provided in embodiments of the present disclosure can include a central unit (CU) and a distributed unit (DU), and the CU can also be referred to as a control unit. The CU-DU structure can separate the network device, for example, the protocol layer of the base station, with some protocol layer functions being placed in the CU under centralized control, and the remaining or all protocol layer functions being distributed in the DU, where DU is centrally controlled by CU.

The terminal device 201 in embodiments of the present disclosure is an entity on the user side for receiving or transmitting signals, such as a mobile phone. The terminal device can also be referred to as a terminal, user equipment (UE), a mobile station (MS), a mobile terminal (MT), etc. The terminal device can include cars with communication capabilities, smart cars, mobile phones, wearable devices, Pads, computers with wireless transmission and reception capabilities, virtual reality (VR) terminal devices, augmented reality (AR) terminal devices, wireless terminal devices in industrial control, wireless terminal devices in self-driving, wireless terminal devices in remote medical surgery, wireless terminal devices in smart grid, wireless terminal devices in transportation safety, wireless terminal devices in smart city, and wireless terminal devices in smart home. Embodiments of the present disclosure do not limit the specific technology and device form adopted by the terminal device.

It can be understood that the communication system described in embodiments of the present disclosure is intended to provide a clearer explanation of technical solutions in the present disclosure, and does not constitute a limitation on the present disclosure. Those of ordinary skill in the art can realize that with the evolution of the system architecture and the emergence of new business scenarios, the technical solutions provided in the embodiments of the present disclosure is also applicable to similar technical problems.

A detailed introduction to a method and a device for triggering a sounding reference signal (SRS) for antenna switching provided in the present disclosure will be provided in the following in conjunction with the drawings.

Figure 3:
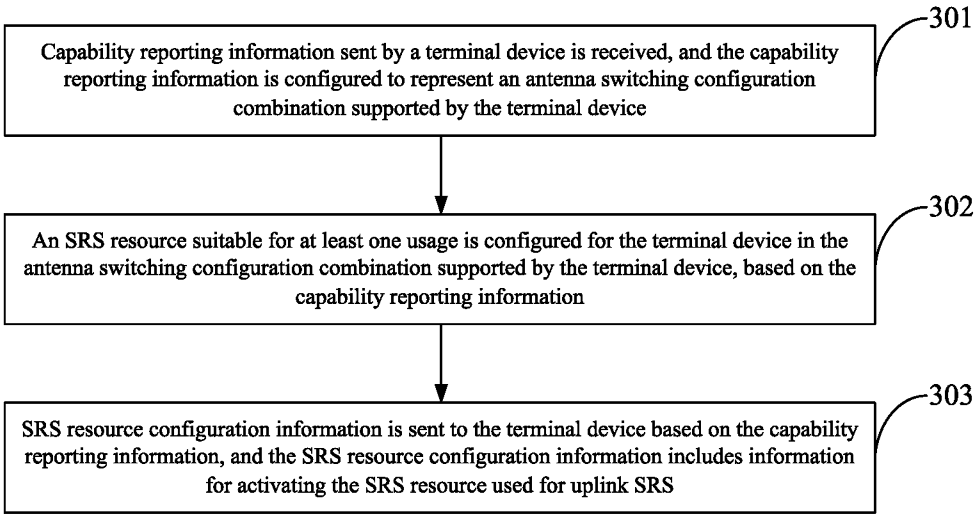
FIG. 3 is a flowchart of a method for triggering a sounding reference signal (SRS) for antenna switching according to embodiments of the present disclosure.

Reference is made to FIG. 3, which illustrates a flowchart of a method for triggering a sounding reference signal (SRS) for antenna switching according to embodiments of the present disclosure. It should be noted that the method for triggering the sounding reference signal (SRS) for antenna switching in embodiments of the present disclosure is performed by the network device. As shown in FIG. 3, the method for triggering the sounding reference signal (SRS) for antenna switching can include but is not limited to the following steps.

In step 301, capability reporting information sent by a terminal device is received, and the capability reporting information is configured to represent an antenna switching configuration combination supported by the terminal device.

It can be understood that in order to adapt to the current business or scenario, the terminal device may need to change its antenna configuration. For example, the antenna configuration is changed from 2T4R to 1T4R or 2T2R, or the antenna configuration is changed from 2T2R to 4T4R. In this case, it is necessary to use different SRS resource configurations suitable for "antenna switching", for obtaining downlink CSI. In some embodiments, the terminal device can inform the network device that it needs to change its antenna configuration based on the current business or scenario. The terminal device can inform the network device by sending the capability reporting information to the network device. For example, the terminal device can send the capability reporting information of the terminal device to the network device, so that the network device receives the capability reporting information sent by the terminal device. The capability reporting information can represent the antenna switching configuration combination supported by the terminal device.

In some embodiments, the UE capabilities supported by the terminals in different releases will also vary, which means that the antenna switching configuration combinations supported by the terminals will also be different. According to embodiments of the present disclosure, in order to be more flexible and fast to switch or fall back to different antenna switching configurations, the terminal device can report the supported antenna switching configuration combination to the network device, so that the network device can configure for the terminal device an SRS resource suitable for at least one usage, based on the capability reporting information from the terminal device and the supported switching configuration combination. The term "at least one" can be understood as one or more.

In step 302, an SRS resource suitable for at least one usage is configured for the terminal device in the antenna switching configuration combination supported by the terminal device, based on the capability reporting information.

In some embodiments, the at least one usage can include antenna switching.

In some embodiments, the methods can allow the SRS resource suitable for antenna switching to be configured within the same BWP (Bandwidth Part) by using RRC (Radio Resource Control) signaling. The SRS resource suitable for antenna switching can be a SRS resource set for different antenna switching configurations that the terminal device can support. In some embodiments, each antenna switching configuration can correspond to one or more SRS resource sets.

In step 303, SRS resource configuration information is sent to the terminal device based on the capability reporting information, and the SRS resource configuration information includes information for activating the SRS resource used for uplink SRS.

It should be noted that in the 5G NR system, the uplink SRS can be semi-persistent SRS or aperiodic SRS, and the methods for triggering the semi-persistent SRS and the aperiodic SRS are different from each other, which will be respectively introduced in the following.

In some embodiments, the SRS can be the semi-persistent SRS (SP-SRS). In this case, the network device can send MAC CE (Medium Access Control Control Element) signaling to the terminal device based on the capability reporting information sent by the terminal device, to trigger the semi-persistent SRS. The MAC CE signaling is configured to simultaneously activate or deactivate a target SRS resource set.

In some embodiments, the target SRS resource set can include an SRS resource set suitable for one or more usages. In some embodiments, the usage can include the same usage, or can include different usages. In some embodiments, for the SRS resource sets suitable for antenna switching, the methods allow one or more SRS resource sets corresponding to a certain configuration to be activated.

In some embodiments, the MAC CE can be used to trigger the semi-persistent SRS (SP-SRS), and the MAC CE is used to simultaneously activate/deactivate the SRS resource sets in the following cases: SRS resource sets suitable for one or more different usages; alternatively, SRS resource sets suitable for one or more usages, and for the SRS resource sets suitable for antenna switching, the methods allow one or more SRS resource sets corresponding to a certain configuration to be activated.

In some embodiments, the SRS can be the aperiodic SRS (A-SRS). In this case, the aperiodic SRS can be triggered through MAC CE and DCI (Downlink Control Information).

In some embodiments, when the SRS is the aperiodic SRS, the triggering of the aperiodic SRS through MAC CE and DCI is described in the following.

In some embodiments, the above step 303 (where SRS resource configuration information is sent to the terminal device based on the capability reporting information) can include sending RRC signaling to the terminal device, and the RRC signaling is not configured with a triggering parameter for an aperiodic SRS resource.

In some embodiments, the above step 303 (where SRS resource configuration information is sent to the terminal device based on the capability reporting information) can further include sending MAC CE signaling to the terminal device based on the capability reporting information, and the MAC CE signaling is configured to activate or update the SRS resource suitable for antenna switching. In some embodiments, one or more SRS resource sets are activated, an entry value for writing a parameter in an aperiodic SRS resource trigger list for each SRS resource set is reconfigured, and entry values for multiple SRS resource sets corresponding to the same antenna switching configuration of the terminal device are restricted to be the same.

In some embodiments, the above step 303 (where SRS resource configuration information is sent to the terminal device based on the capability reporting information) can further include sending DCI (Downlink Control Information) to the terminal device, and triggering configurations of aperiodic SRS resource triggers corresponding to values of different codepoints through an aperiodic SRS resource triggering request field of DCI.

In some embodiments, the triggering of the aperiodic SRS through MAC CE and DCI can include: 1) The aperiodic SRS (A-SRS) resource set is not configured with a triggering parameter for aperiodic SRS resources in the RRC signaling. The triggering parameter can be a high-layer signaling parameter aperiodicSRS-ResourceTrigger (aperiodic SRS resource trigger). 2) The activation/updating for the SRS resources suitable for antenna switching can be performed through the MAC CE. One or more SRS resource sets can be activated, and the entry value in the aperiodicSRS-ResourceTriggerList (aperiodic SRS resource trigger list) for each SRS resource set can be reconfigured. At the same time, entry values for multiple SRS resource sets corresponding to the same antenna switching configuration of the terminal device are restricted to be the same value. 3) The SRS triggering request field in existing/extended DCI can be used to trigger the SRS resource set through codepoints. For example, configurations of aperiodic SRS resource triggers corresponding to values of different codepoints are triggered by using the SRS triggering request field of DCI.

In some embodiments, the MAC CE and the user-grouped GC-DCI (Group Common Downlink Control Information) can also be used to trigger the aperiodic SRS. In this case, the configuration through the RRC signaling and the configuration through the MAC CE are the same as those configurations in the above embodiments, which will not be repeated here. In the current case, GC-DCI is used for configuration. In some embodiments, the step 303 can include the following steps: sending enhanced DCI2_3 to the terminal device, and the enhanced DCI2_3 is configured to indicate a triggering codepoint corresponding to an aperiodic SRS resource triggering request field, to trigger SRS of a group of terminal devices in enhanced manner, alternatively, sending the user-grouped GC-DCI (Group Common Downlink Control Information) to the terminal device, and the GC-DCI is configured to indicate a triggering codepoint corresponding to the aperiodic SRS resource triggering request field, to trigger SRS of a group of terminal devices in enhanced manner.

In some embodiments, the triggering of the aperiodic SRS by using the MAC CE and the user-grouped GC-DCI (Group Common Downlink Control Information) can include: 1) The aperiodic SRS (A-SRS) resource set is not configured with a triggering parameter for aperiodic SRS resources in the RRC signaling. The triggering parameter can be a high-layer signaling parameter aperiodicSRS-ResourceTrigger (aperiodic SRS resource trigger). 2) The activation/updating for the SRS suitable for antenna switching can be performed through the MAC CE. One or more SRS resource sets can be activated, and the entry value in the aperiodicSRS-ResourceTriggerList (aperiodic SRS resource trigger list) for each SRS resource set can be reconfigured. At the same time, entry values for multiple SRS resource sets corresponding to the same antenna switching configuration of the terminal device are restricted to be the same value. 3) The enhanced DCI2_3 can be used or a new GC-DCI is designed. The enhanced DCI2_3 or the new GC-DCI can be configured to indicate the triggering codepoint corresponding to the SRS triggering request field, and can be used to trigger the SRS of a group of terminal devices in enhanced manner, thereby reducing signaling overhead.

In some embodiments of present disclosure, when the SRS is the aperiodic SRS, the triggering of the aperiodic SRS through MAC CE and DCI is described in the following.

In some embodiments, the above step 303 (where SRS resource configuration information is sent to the terminal device based on the capability reporting information) can include sending MAC CE signaling to the terminal device based on capability reporting information, and the MAC CE is configured to activate or update values of some codepoints in some aperiodic SRS resource trigger lists configured by RRC.

In some embodiments, the above step 303 (where SRS resource configuration information is sent to the terminal device based on the capability reporting information) can further include sending DCI (Downlink Control Information) to the terminal device, and triggering SRS resource set(s) suitable for one or more different usages through an aperiodic SRS resource triggering request field of DCI. The usages include antenna switching. In some embodiments, the SRS resource set(s) suitable for one or more different usages can include one or more SRS resource sets corresponding to the antenna switching configuration.

In some embodiments, the triggering of the aperiodic SRS through MAC CE and DCI can include: 1) The MAC CE is used to activate/update values of some codepoints in some aperiodicSRS-ResourceTriggerList (aperiodic SRS resource trigger list(s)) configured by RRC. 2) The SRS triggering request field in existing/extended DCI can be used to trigger the SRS resource set(s) suitable for one or more different usages through codepoints. The usages can include antenna switching. The SRS resource set(s) suitable for one or more different usages can include one or more SRS resource sets corresponding to a certain antenna switching configuration.

In some embodiments, the MAC CE and the GC-DCI can also be used to trigger the aperiodic SRS. In this case, the configuration through the RRC signaling and the configuration through the MAC CE are the same as those configurations in the above embodiments, which will not be repeated here. In the current case, GC-DCI is used for configuration. In some embodiments, the step 303 can include the following steps: sending enhanced DCI2_3 to the terminal device, and the enhanced DCI2_3 is configured to indicate a triggering codepoint corresponding to an aperiodic SRS resource triggering request field, to trigger SRS of a group of terminal devices in enhanced manner, alternatively, sending the user-grouped GC-DCI (Group Common Downlink Control Information) to the terminal device, and the GC-DCI is configured to indicate a triggering codepoint corresponding to the aperiodic SRS resource triggering request field, to trigger SRS of a group of terminal devices in enhanced manner.

In some embodiments, the triggering of the aperiodic SRS by using the MAC CE and the GC-DCI includes: 1) The MAC CE is used to activate/update values of some codepoints in some aperiodicSRS-ResourceTriggerList (aperiodic SRS resource trigger list(s)) configured by RRC. 2) The enhanced DCI2_3 can be used or a new GC-DCI is designed. The enhanced DCI2_3 or the new GC-DCI can be configured to indicate the triggering codepoint corresponding to the SRS triggering request field, and can be used to trigger the SRS of a group of terminal devices in enhanced manner, thereby reducing signaling overhead.

According to embodiments of the present disclosure, the triggering of SRS can be achieved through MAC CE, which can save very tight DCI signaling overhead currently and can be directly implemented without modifying or simply expanding the existing SRS triggering design in release R15/R16. The hybrid control scheme disclosed in the present disclosure can be more flexible and fast to switch or fall back to different antenna switching configurations.

Figure 4:
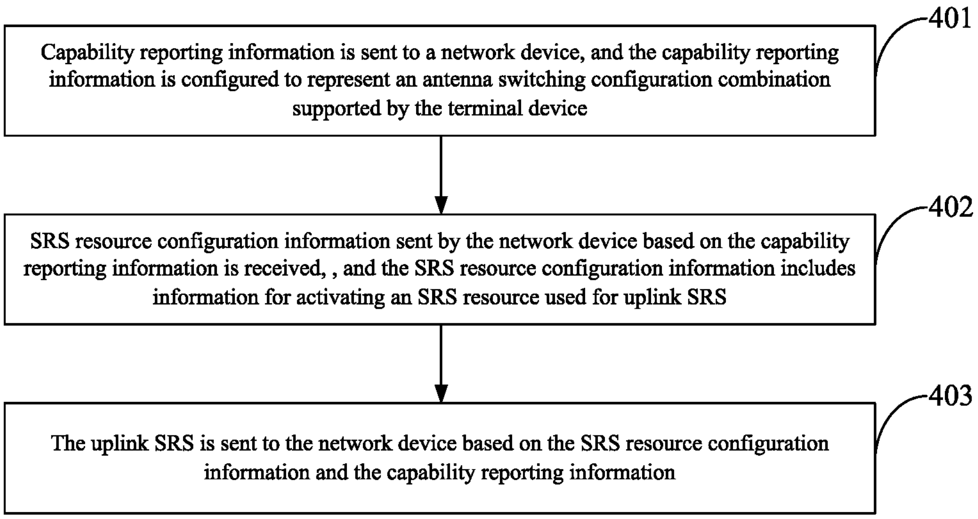
FIG. 4 is a flowchart of a method for triggering a sounding reference signal (SRS) for antenna switching according to embodiments of the present disclosure.

It can be understood that the above embodiments provide the method for triggering the sounding reference signal (SRS) for antenna switching disclosed in the present disclosure from the network device side. Embodiments of the present disclosure also provide another method for triggering the sounding reference signal (SRS) for antenna switching, which will be described from the terminal device side. Reference is made to FIG. 4, which illustrates a flowchart of a method for triggering a sounding reference signal (SRS) for antenna switching according to embodiments of the present disclosure. It should be noted that the method for triggering the sounding reference signal (SRS) for antenna switching in embodiments of the present disclosure can be performed by the terminal device. As shown in FIG. 4, the method for triggering the sounding reference signal (SRS) for antenna switching can include but is not limited to the following steps.

In step 401, capability reporting information is sent to a network device, and the capability reporting information is configured to represent an antenna switching configuration combination supported by the terminal device.

It can be understood that in order to adapt to the current business or scenario, the terminal device may need to change its antenna configuration. For example, the antenna configuration is changed from 2T4R to 1T4R or 2T2R, or the antenna configuration is changed from 2T2R to 4T4R. In this case, it is necessary to use different SRS resource configurations suitable for "antenna switching", for obtaining downlink CSI. In some embodiments, the terminal device can inform the network device that it needs to change its antenna configuration based on the current business or scenario. The terminal device can inform the network device by sending the capability reporting information to the network device. For example, the terminal device can send the capability reporting information of the terminal device to the network device, so that the network device receives the capability reporting information sent by the terminal device. The capability reporting information can represent the antenna switching configuration combination supported by the terminal device.

In some embodiments, the UE capabilities supported by the terminals in different releases will also vary, which means that the antenna switching configuration combinations supported by the terminals will also be different. According to embodiments of the present disclosure, in order to be more flexible and fast to switch or fall back to different antenna switching configurations, the terminal device can report the supported antenna switching configuration combination to the network device, so that the network device can configure for the terminal device an SRS resource suitable for at least one usage, based on the capability reporting information from the terminal device and the supported switching configuration combination. The at least one usage can include antenna switching.

In step 402, SRS resource configuration information sent by the network device based on the capability reporting information is received, and the SRS resource configuration information includes information for activating an SRS resource used for uplink SRS.

It should be noted that in the 5G NR system, the uplink SRS can be semi-persistent SRS or aperiodic SRS, and the methods for triggering the semi-persistent SRS and the aperiodic SRS are different from each other, which will be respectively introduced in the following.

In some embodiments, the SRS can be the semi-persistent SRS (SP-SRS). In this case, the network device can send MAC CE (Medium Access Control Control Element) signaling to the terminal device based on the capability reporting information sent by the terminal device, to trigger the semi-persistent SRS. The terminal device can receive the MAC CE (Medium Access Control Control Element) signaling sent by the network device based on the capability reporting information. The MAC CE signaling is configured to simultaneously activate or deactivate a target SRS resource set.

In some embodiments, the target SRS resource set can include an SRS resource set suitable for one or more usages.

In some embodiments, the usage can include the same usage, or can include different usages. In some embodiments, for the SRS resource sets suitable for antenna switching, the methods allow one or more SRS resource sets corresponding to a certain configuration to be activated.

In some embodiments, the MAC CE can be used to trigger the semi-persistent SRS (SP-SRS), and the MAC CE is used to simultaneously activate/deactivate the SRS resource sets in the following cases: SRS resource sets suitable for one or more different usages; alternatively, SRS resource sets suitable for one or more usages, and for the SRS resource sets suitable for antenna switching, the methods allow one or more SRS resource sets corresponding to a certain configuration to be activated.

In some embodiments, the SRS can be the aperiodic SRS (A-SRS). In this case, the aperiodic SRS can be triggered through MAC CE and DCI (Downlink Control Information).

In some embodiments, when the SRS is the aperiodic SRS, the triggering of the aperiodic SRS through MAC CE and DCI is described in the following.

In some embodiments, the above step 402 (where SRS resource configuration information sent by the network device based on the capability reporting information is received) can include receiving RRC signaling sent by the network device, and the RRC signaling is not configured with a triggering parameter for an aperiodic SRS resource.

In some embodiments, the above step 402 (where SRS resource configuration information sent by the network device based on the capability reporting information is received) can further include receiving MAC CE signaling sent by the network device based on the capability reporting information, and the MAC CE signaling is configured to activate or update the SRS resource suitable for antenna switching. In some embodiments, one or more SRS resource sets are activated, an entry value for writing a parameter in an aperiodic SRS resource trigger list for each SRS resource set is reconfigured, and entry values for multiple SRS resource sets corresponding to the same antenna switching configuration of the terminal device are restricted to be the same.

In some embodiments, the above step 402 (where SRS resource configuration information sent by the network device based on the capability reporting information is received) can further include receiving the DCI (Downlink Control Information) sent by the network device, and an SRS triggering request field of DCI is configured to trigger configurations of aperiodic SRS resource triggers corresponding to values of different codepoints.

In some embodiments, the triggering of the aperiodic SRS through MAC CE and DCI can include: 1) The aperiodic SRS (A-SRS) resource set is not configured with a triggering parameter for aperiodic SRS resources in the RRC signaling. The triggering parameter can be a high-layer signaling parameter aperiodicSRS-ResourceTrigger (aperiodic SRS resource trigger). 2) The activation/updating for the SRS suitable for antenna switching can be performed through the MAC CE. One or more SRS resource sets can be activated, and the entry value in the aperiodicSRS-ResourceTriggerList (aperiodic SRS resource trigger list) for each SRS resource set can be reconfigured. At the same time, entry values for multiple SRS resource sets corresponding to the same antenna switching configuration of the terminal device are restricted to be the same value. 3) The SRS triggering request field in existing/extended DCI can be used to trigger the SRS resource set through codepoints. For example, configurations of aperiodic SRS resource triggers corresponding to values of different codepoints are triggered by using the SRS triggering request field of DCI.

In some embodiments, the MAC CE and the user-grouped GC-DCI (Group Common Downlink Control Information) can also be used to trigger the aperiodic SRS. In this case, the configuration through the RRC signaling and the configuration through the MAC CE are the same as those configurations in the above embodiments, which will not be repeated here. In the current case, GC-DCI is used for configuration. In some embodiments, the step 402 can include the following steps: receiving enhanced DCI2_3 sent by the network device, and the enhanced DCI2_3 is configured to indicate a triggering codepoint corresponding to an aperiodic SRS resource triggering request field, to trigger SRS of a group of terminal devices in enhanced manner, alternatively, receiving the user-grouped GC-DCI (Group Common Downlink Control Information) sent by the network device, and the GC-DCI is configured to indicate a triggering codepoint corresponding to the aperiodic SRS resource triggering request field, to trigger SRS of a group of terminal devices in enhanced manner.

In some embodiments, the triggering of the aperiodic SRS by using the MAC CE and the user-grouped GC-DCI (Group Common Downlink Control Information) can include: 1) The aperiodic SRS (A-SRS) resource set is not configured with a triggering parameter for aperiodic SRS resources in the RRC signaling. The triggering parameter can be a high-layer signaling parameter aperiodicSRS-ResourceTrigger (aperiodic SRS resource trigger). 2) The activation/updating for the SRS suitable for antenna switching can be performed through the MAC CE. One or more SRS resource sets can be activated, and the entry value in the aperiodicSRS-ResourceTriggerList (aperiodic SRS resource trigger list) for each SRS resource set can be reconfigured. At the same time, entry values for multiple SRS resource sets corresponding to the same antenna switching configuration of the terminal device are restricted to be the same value. 3) The enhanced DCI2_3 can be used or a new GC-DCI is designed. The enhanced DCI2_3 or the new GC-DCI can be configured to indicate the triggering codepoint corresponding to the SRS triggering request field, and can be used to trigger the SRS of a group of terminal devices in enhanced manner, thereby reducing signaling overhead.

In some embodiments of present disclosure, when the SRS is the aperiodic SRS, the triggering of the aperiodic SRS through MAC CE and DCI is described in the following.

In some embodiments, the above step 402 (where SRS resource configuration information sent by the network device based on the capability reporting information is received) can include receiving MAC CE signaling sent by the network device based on the capability reporting information, and the MAC CE is configured to activate or update values of some codepoints in some aperiodic SRS resource trigger lists configured by RRC.

In some embodiments, the above step 402 (where SRS resource configuration information sent by the network device based on the capability reporting information is received) can further include receiving DCI (Downlink Control Information) sent by the network device, and an aperiodic SRS resource triggering request field of DCI is configured to trigger SRS resource set(s) suitable for one or more different usages. The usages include antenna switching. In some embodiments, the SRS resource set(s) suitable for one or more different usages can include one or more SRS resource sets corresponding to the antenna switching configuration. In some embodiments, the triggering of the aperiodic SRS through MAC CE and DCI can include: 1) The MAC CE is used to activate/update values of some codepoints in some aperiodicSRS-ResourceTriggerList (aperiodic SRS resource trigger list(s)) configured by RRC. 2) The SRS triggering request field in existing/extended DCI can be used to trigger the SRS resource set(s) suitable for one or more different usages through codepoints. The usages can include antenna switching. The SRS resource set(s) suitable for one or more different usages can include one or more SRS resource sets corresponding to a certain antenna switching configuration.

In some embodiments, the MAC CE and the GC-DCI can also be used to trigger the aperiodic SRS. In this case, the configuration through the RRC signaling and the configuration through the MAC CE are the same as those configurations in the above embodiments, which will not be repeated here. In the current case, GC-DCI is used for configuration. In some embodiments, the step 402 can include the following steps: receiving enhanced DCI2_3 sent by the network device, and the enhanced DCI2_3 is configured to indicate a triggering codepoint corresponding to an aperiodic SRS resource triggering request field, to trigger SRS of a group of terminal devices in enhanced manner, alternatively, receiving the user-grouped GC-DCI (Group Common Downlink Control Information) sent by the network device, and the GC-DCI is configured to indicate a triggering codepoint corresponding to the aperiodic SRS resource triggering request field, to trigger SRS of a group of terminal devices in enhanced manner.

In some embodiments, the triggering of the aperiodic SRS by using the MAC CE and the GC-DCI can include: 1) The MAC CE is used to activate/update values of some codepoints in some aperiodicSRS-ResourceTriggerList (aperiodic SRS resource trigger list(s)) configured by RRC. 2) The enhanced DCI2_3 can be used or a new GC-DCI is designed. The enhanced DCI2_3 or the new GC-DCI can be configured to indicate the triggering codepoint corresponding to the SRS triggering request field, and can be used to trigger the SRS of a group of terminal devices in enhanced manner, thereby reducing signaling overhead.

In step 403, the uplink SRS is sent to the network device based on the SRS resource configuration information and the capability reporting information.

In some embodiments, after receiving the SRS resource configuration information sent by the network device based on the capability reporting information, the terminal device can send uplink SRS to the network device based on the SRS resource configuration information and the capability reporting information, for obtaining CSI.

According to embodiments of the present disclosure, the triggering of SRS can be achieved through MAC CE, which can save very tight DCI signaling overhead currently and can be directly implemented without modifying or simply expanding the existing SRS triggering design in release R15/R16. The hybrid control scheme disclosed in the present disclosure can be more flexible and fast to switch or fall back to different antenna switching configurations.

The methods provided in embodiments of the present disclosure are introduced from the network device side and the terminal device side. In order to achieve the various functions of the methods provided in embodiments of the present disclosure, the network device and the terminal device can include hardware structures and software modules, which are implemented in the form of hardware structures, software modules, or the hardware structures and the software modules. One of the above functions can be achieved in the form of hardware structures, software modules, or the hardware structures and the software modules.

Figure 5:
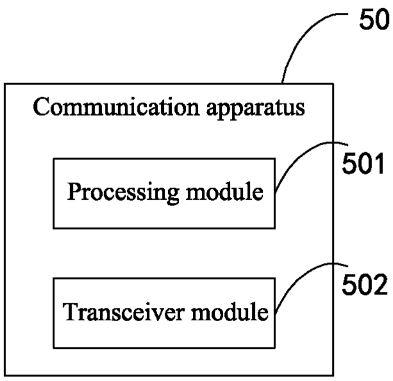
FIG. 5 is a schematic diagram of a structure of a communication apparatus according to embodiments of the present disclosure.

Reference is made to FIG. 5, which illustrates a schematic diagram of a structure of a communication apparatus 50 according to embodiments of the present disclosure. The communication apparatus 50 as shown in FIG. 5 can include a processing module 501 and a transceiver module 502. The transceiver module 502 can include a sending module and/or a receiving module. The sending module is configured for implementing the sending function, the receiving module is configured for implementing the receiving function, and the transceiver module 502 is configured for implementing the sending and/or receiving function.

The communication apparatus 50 can be a network device, or an apparatus within the network device, or an apparatus that can be matched and operated with the network device. Alternatively, the communication apparatus 50 can be a terminal device, or an apparatus within the terminal device, or an apparatus that can be matched and operated with the terminal device.

In some embodiments of the present disclosure, the communication apparatus 50 is a network device, and the transceiver module 502 is configured to receive capability reporting information sent by a terminal device, and the capability reporting information is configured to represent an antenna switching configuration combination supported by the terminal device. The processing module 501 is configured to configure an SRS resource suitable for at least one usage for the terminal device, in the antenna switching configuration combination supported by the terminal device, based on capability reporting information, the at least one usage including an antenna switching configuration. The transceiver module 502 is further configured to send, based on the capability reporting information, SRS resource configuration information to the terminal device, and the SRS resource configuration information includes information for activating the SRS resource used for uplink SRS.

In some embodiments, the SRS resource suitable for the antenna switching configuration is allowed to be configured within the same BWP (Bandwidth Part) by using RRC (Radio Resource Control) signaling. The SRS resource suitable for the antenna switching configuration can be a SRS resource set for different antenna switching configurations that the terminal device can support. In some embodiments, each antenna switching configuration can be configured with one or more SRS resource sets.

In some embodiments, the SRS is the semi-persistent SRS. In this case, the processing module 501 is further configured to send MAC CE (Medium Access Control Control Element) signaling to the terminal device based on the capability reporting information sent by the terminal device, to trigger the semi-persistent SRS. The MAC CE signaling is configured to simultaneously activate or deactivate a target SRS resource set.

In some embodiments, the target SRS resource set can include an SRS resource set suitable for one or more usages. In some embodiments, for the SRS resource sets suitable for antenna switching, the methods allow one or more SRS resource sets corresponding to a certain configuration to be activated.

In some embodiments, the SRS is the aperiodic SRS. In this case, the processing module 501 is further configured to send RRC signaling to the terminal device, and the RRC signaling is not configured with a triggering parameter for an aperiodic SRS resource.

In some embodiments, the processing module 501 is further configured to send MAC CE signaling to the terminal device based on the capability reporting information, and the MAC CE signaling is configured to activate or update the SRS used for antenna switching. In some embodiments, one or more SRS resource sets are activated, an entry value for writing a parameter in an aperiodic SRS resource trigger list for each SRS resource set is reconfigured, and entry values for multiple SRS resource sets corresponding to the same antenna switching configuration of the terminal device are restricted to be the same.

In some embodiments, the processing module 501 is further configured to send DCI (Downlink Control Information) to the terminal device, and trigger configurations of aperiodic SRS resource triggers corresponding to values of different codepoints through an aperiodic SRS resource triggering request field of DCI.

In some embodiments, the processing module 501 is further configured to send enhanced DCI2_3 to the terminal device, and the enhanced DCI2_3 is configured to indicate a triggering codepoint corresponding to an aperiodic SRS resource triggering request field, to trigger SRS of a group of terminal devices in enhanced manner. Alternatively, the processing module 501 is further configured to send user-grouped GC-DCI (Group Common Downlink Control Information) to the terminal device, and the GC-DCI is configured to indicate a triggering codepoint corresponding to the aperiodic SRS resource triggering request field, to trigger SRS of a group of terminal devices in enhanced manner.

In some embodiments, the SRS is the aperiodic SRS, and the processing module 501 is further configured to send MAC CE signaling to the terminal device based on capability reporting information, and the MAC CE is configured to activate or update values of some codepoints in some aperiodic SRS resource trigger lists configured by RRC.

In some embodiments, the processing module 501 is further configured to send DCI (Downlink Control Information) to the terminal device, and trigger SRS resource set(s) suitable for one or more different usages through an aperiodic SRS resource triggering request field of DCI. The usages include the antenna switching configuration. In some embodiments, the SRS resource set(s) suitable for one or more different usages can include one or more SRS resource sets corresponding to the antenna switching configuration.

In some embodiments, the processing module 501 is further configured to send enhanced DCI2_3 to the terminal device, and the enhanced DCI2_3 is configured to indicate a triggering codepoint corresponding to an aperiodic SRS resource triggering request field, to trigger SRS of a group of terminal devices in enhanced manner. Alternatively, the processing module 501 is further configured to send user-grouped GC-DCI (Group Common Downlink Control Information) to the terminal device, and the GC-DCI is configured to indicate a triggering codepoint corresponding to the aperiodic SRS resource triggering request field, to trigger SRS of a group of terminal devices in enhanced manner.

In some embodiments of the present disclosure, the communication apparatus 50 is the terminal device, and the transceiver module 502 is configured to send capability reporting information to the network device, and the capability reporting information is configured to represent an antenna switching configuration combination supported by the terminal device. The transceiver module 502 is further configured to receive SRS resource configuration information sent by the network device based on the capability reporting information, and send uplink SRS to the network device based on the SRS resource configuration information and the capability reporting information.

In some embodiments, the SRS is the semi-persistent SRS, and the transceiver module 502 is further configured to receive MAC CE signaling sent by the network device based on the capability reporting information, and the MAC CE signaling is configured to simultaneously activate or deactivate a target SRS resource set.

In some embodiments, the target SRS resource set can include an SRS resource set suitable for one or more usages. In some embodiments, for the SRS resource sets suitable for antenna switching, the methods allow one or more SRS resource sets corresponding to a certain configuration to be activated.

In some embodiments, the SRS is the aperiodic SRS, and the transceiver module 502 is further configured to receive RRC signaling sent by the network device, and the RRC signaling is not configured with a triggering parameter for an aperiodic SRS resource.

In some embodiments, the transceiver module 502 is further configured to receive MAC CE signaling sent by the network device based on the capability reporting information, and the MAC CE signaling is configured to activate or update the SRS used for antenna switching. In some embodiments, one or more SRS resource sets are activated, an entry value for writing a parameter in an aperiodic SRS resource trigger list for each SRS resource set is reconfigured, and entry values for multiple SRS resource sets corresponding to the same antenna switching configuration of the terminal device are restricted to be the same.

In some embodiments, the transceiver module 502 is further configured to receive DCI (Downlink Control Information) sent by the network device, and an SRS triggering request field of DCI is configured to trigger configurations of aperiodic SRS resource triggers corresponding to values of different codepoints.

In some embodiments, the transceiver module 502 is further configured to receive enhanced DCI2_3 sent by the network device, and the enhanced DCI2_3 is configured to indicate a triggering codepoint corresponding to an aperiodic SRS resource triggering request field, to trigger SRS of a group of terminal devices in enhanced manner. Alternatively, the transceiver module 502 is further configured to receive user-grouped GC-DCI (Group Common Downlink Control Information) sent by the network device, and the GC-DCI is configured to indicate a triggering codepoint corresponding to the aperiodic SRS resource triggering request field, to trigger SRS of a group of terminal devices in enhanced manner.

In some embodiments, the SRS is the aperiodic SRS, and the transceiver module 502 is further configured to receive MAC CE signaling sent by the network device based on the capability reporting information, and the MAC CE is configured to activate or update values of some codepoints in some aperiodic SRS resource trigger lists configured by RRC.

In some embodiments, the transceiver module 502 is further configured to receive DCI (Downlink Control Information) sent by the network device, and an aperiodic SRS resource triggering request field of DCI is configured to trigger SRS resource set(s) suitable for one or more different usages. The usages include the antenna switching configuration. In some embodiments, the SRS resource set(s) suitable for one or more different usages can include one or more SRS resource sets corresponding to the antenna switching configuration.

In some embodiments, the transceiver module 502 is further configured to receive enhanced DCI2_3 sent by the network device, and the enhanced DCI2_3 is configured to indicate a triggering codepoint corresponding to an aperiodic SRS resource triggering request field, to trigger SRS of a group of terminal devices in enhanced manner. Alternatively, the transceiver module 502 is further configured to receive user-grouped GC-DCI (Group Common Downlink Control Information) sent by the network device, and the GC-DCI is configured to indicate a triggering codepoint corresponding to the aperiodic SRS resource triggering request field, to trigger SRS of a group of terminal devices in enhanced manner.

Specific ways in which each module in the apparatus executes steps of the method for triggering a sounding reference signal (SRS) for antenna switching have been described in detail in the above method embodiments, which will not be elaborated here.

Figure 6:
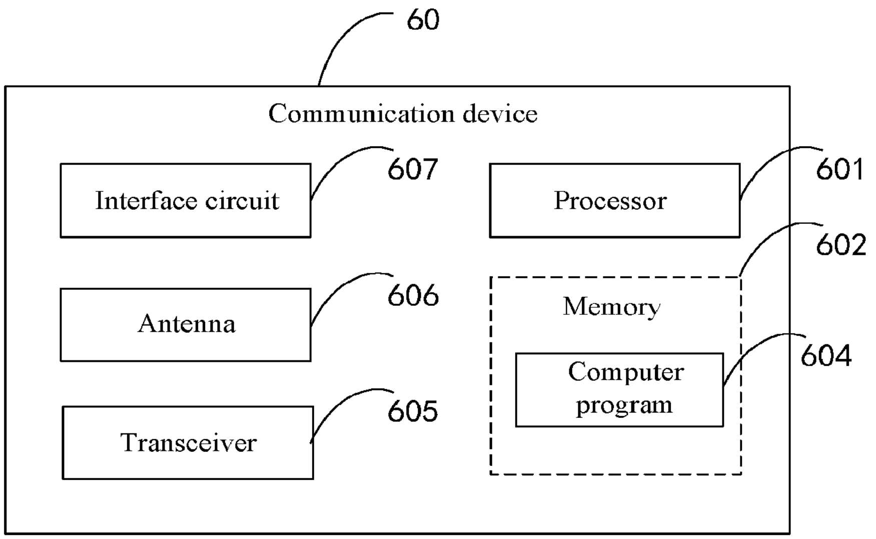
FIG. 6 is a schematic diagram of a structure of a communication device according to embodiments of the present disclosure.

Reference is made to FIG. 6, which illustrates a schematic diagram of a structure of a communication device 60 according to embodiments of the present disclosure. The communication device 60 can be a network device, a terminal device, a chip, a chip system, or a processor that supports the network device to implement the above methods, and the communication device 60 can also be a chip, a chip system, or a processor that supports the terminal device to implement the above methods. The device can be used to implement the methods described in the above method embodiments. Specifically, reference can be made to the description in the above method embodiments.

The communication device 60 can include one or more processors 601. The processor 601 can be a general-purpose processor or a dedicated processor, etc. For example, the processor can be a baseband processor or a central processor. The baseband processor can be used to process communication protocols and communication data, and the central processor can be used to control the communication device (such as base stations, baseband chips, terminal devices, terminal device chips, DU or CU, etc.), execute computer programs, and process computer program data.

In some embodiments, the communication device 60 can also include one or more memories 602, and a computer program 604 can be stored on the memory. The processor 601 can execute the computer program 604 to cause the communication device 60 to implement the methods described in the above embodiments. In some embodiments, the memory 602 can also store data. The communication device 60 and the memory 602 can be arranged separately or integrated together.

In some embodiments, the communication device 60 can also include a transceiver 605 and an antenna 606. The transceiver 605 can be referred to as a transceiver unit, a transceiver machine, or a transceiver circuit, etc., and can be used to achieve a transceiving function. The transceiver 605 can include a receiver and a transmitter. The receiver can be referred to as a receiver or a receiver circuit, etc., and is used to achieve a receiving function. The transmitter can be referred to as a transmitter or a transmitter circuit, etc., and is used to achieve a transmitting function.

In some embodiments, the communication device 60 can also include one or more interface circuits 607. The interface circuit 607 is used to receive code instructions and transmit the code instructions to the processor 601. The processor 601 executes the code instructions to cause the communication device 60 to implement the methods described in the above method embodiments.

The communication device 60 is a network device, the processor 601 is used to execute step 302 in FIG. 3, and the transceiver 605 is used to execute steps 301 and 303 in FIG. 3.

The communication device 60 is a terminal device, and the transceiver 605 is used to execute steps 401, 402, and 403 in FIG. 4.

In some embodiments, the processor 601 can include a transceiver for achieving receiving and transmitting functions. For example, the transceiver can be a transceiver circuit, an interface, or an interface circuit. The transceiver circuit, interface, or interface circuit used to achieve receiving and transmitting functions can be separate or integrated together. The above-mentioned transceiver circuit, interface or interface circuit can be used for reading and writing codes/data, or the above-mentioned transceiver circuit, interface or interface circuit can be used for transmitting or transferring signals.

In some embodiments, the processor 601 can store a computer program 603, which runs on the processor 601 and causes the communication device 60 to implement the methods described in the above embodiments. The computer program 603 can be embedded in processor 601, in which case the processor 601 can be realized through hardware.

In some embodiments, the communication device 60 can include a circuit that can achieve receiving, transmitting, or communicating functions as described in the above method embodiments. The processor and the transceiver described in the present disclosure can be realized on the integrated circuit (IC), analog IC, radio frequency integrated circuit (RFIC), mixed signal IC, application specific integrated circuit (ASIC), printed circuit board (PCB), electronic device, and the like. The processor and the transceiver can also be manufactured using various IC process technologies, such as complementary metal oxide semiconductor (CMOS), N-type metal oxide semiconductor (NMOS), P-type metal oxide semiconductor (PMOS), bipolar junction transistor (BJT), bipolar CMOS (BiCMOS), silicon germanium (SiGe), gallium arsenide (GaAs), etc.

The communication device described in the above embodiments can be a receiving terminal or a transmitting terminal, but the communication device described in the present disclosure is not limited to this, and the structure of the communication device may not be limited by FIG. 6. The communication device can be an independent device or can be part of a larger device. For example, the communication device can be at least one of:

(1) Independent integrated circuit ICs, or chips, or chip systems or subsystems.

(2) A set including one or more ICs, which can optionally also include storage components for storing data and computer programs.

(3) ASICs, for example, a modem.

(4) Modules that can be embedded in other devices.

(5) Receivers, terminal devices, intelligent terminal devices, cellular phones, wireless devices, handheld devices, mobile units, vehicle mounted devices, network devices, cloud devices, artificial intelligence devices, etc.

(6) Other devices and so on.

Those skilled in the art can also understand that the various illustrative logical blocks and steps listed in the embodiments of the present disclosure can be achieved through electronic hardware, computer software, or a combination of both. Whether a function is achieved through hardware or software depends on the specific application and design requirements of the overall system. Those skilled in the art can use various methods to achieve the described functions for each specific application, but such achievement should not be understood as beyond the protection scope of the present disclosure.

Embodiments of the present disclosure also provide a communication apparatus. The communication apparatus can implement some or all of the functions of the network device in the method described in the above method embodiments, for example, the functions of the communication apparatus have some or all of functions described in embodiments of the present disclosure, or can independently implement any one of the embodiments of the present disclosure. The functions described can be implemented through hardware or by executing corresponding software through hardware. The hardware or software includes one or more units or modules corresponding to the above functions.

In some embodiments, the communication apparatus can include a transceiver module and a processing module. The processing module is configured to support the communication apparatus in achieving the corresponding functions in the above methods.

The transceiver module is configured to support the communication between the communication apparatus and other devices. The communication apparatus can further include a storage module for coupling with the transceiver module and the processing module. The storage module stores necessary computer programs and data for the communication apparatus.

In some embodiments, the processing module can be a processor, the transceiver module can be a transceiver or a communication interface, and the storage module can be a memory.

Embodiments of the present disclosure also provide a communication device including a processor, which causes the method described in the above method embodiments to be implemented when the processor calls a computer program in memory.

Embodiments of the present disclosure also provide a communication device including a processor and an interface circuit, wherein the interface circuit is configured to receive and transmit code instructions to the processor, and the processor is configured to run the code instructions to cause the method described in the above method embodiments to be implemented.

Embodiments of the present disclosure also provide a communication system for triggering a sounding reference signal (SRS) used for antenna switching, which includes a communication device serving as a network device and a communication device serving as a terminal device in embodiments of FIG. 5, or a communication device serving as a network device and a communication device serving as a terminal device in embodiments of FIG. 6.

The present disclosure also provides a non-transitory computer-readable storage medium on which instructions are stored, and when the instructions are executed by a computer, the functions of any of the above method embodiments are achieved.

The present disclosure also provides a computer program product that achieves the functions of any of the above method embodiments when executed by a computer.

The present disclosure also provides a computer program, which when is running on a computer, causes the computer to implement the method described in the above method embodiments.

In some embodiments, the SRS resource suitable for antenna switching is configured within the same Bandwidth Part (BWP) by using Radio Resource Control (RRC) signaling, the SRS resource suitable for antenna switching includes a SRS resource set for different antenna switching configurations that the terminal device can support, and each antenna switching configuration corresponds to one or more SRS resource sets.

In some embodiments, when the SRS is semi-persistent SRS, configuring, in the antenna switching configuration combination supported by the terminal device, an SRS resource suitable for at least one usage, for the terminal device based on the capability reporting information includes: sending, based on the capability reporting information, Medium Access Control Control Element (MAC CE) signaling to the terminal device to trigger the semi-persistent SRS, wherein the MAC CE signaling is configured to simultaneously activate or deactivate a target SRS resource set.

In some embodiments, the target SRS resource set includes an SRS resource set suitable for one or more usages, and for the SRS resource set suitable for antenna switching, one or more SRS resource sets corresponding to a certain antenna switching configuration can be activated.

In some embodiments, when the SRS is aperiodic SRS, configuring, in the antenna switching configuration combination supported by the terminal device, an SRS resource suitable for at least one usage, for the terminal device based on the capability reporting information includes: sending RRC signaling to the terminal device, wherein the RRC signaling is not configured with a triggering parameter for an aperiodic SRS resource.

In some embodiments, configuring, in the antenna switching configuration combination supported by the terminal device, an SRS resource suitable for at least one usage, for the terminal device based on the capability reporting information further includes: sending, based on the capability reporting information, MAC CE signaling to the terminal device, wherein the MAC CE signaling is configured to activate or update the SRS resource suitable for antenna switching, and wherein one or more SRS resource sets are activated, and an entry value for writing a parameter in an aperiodic SRS resource trigger list for each SRS resource set is reconfigured, and wherein entry values for multiple SRS resource sets corresponding to the same antenna switching configuration of the terminal device are restricted to be the same.

In some embodiments, configuring, in the antenna switching configuration combination supported by the terminal device, an SRS resource suitable for at least one usage, for the terminal device based on the capability reporting information further includes: sending Downlink Control Information (DCI) to the terminal device, and triggering configurations of aperiodic SRS resource triggers corresponding to values of different codepoints through an aperiodic SRS resource triggering request field of the DCI.

In some embodiments, sending Downlink Control Information (DCI) to the terminal device, and triggering configurations of aperiodic SRS resource triggers corresponding to values of different codepoints through an aperiodic SRS resource triggering request field of the DCI includes: sending enhanced DCI2_3 to the terminal device, wherein the enhanced DCI2_3 is configured to indicate a triggering codepoint corresponding to an aperiodic SRS resource triggering request field, to trigger SRS of a group of terminal devices in enhanced manner; or sending user-grouped Group Common Downlink Control Information (GC-DCI) to the terminal device, wherein the GC-DCI is configured to indicate a triggering codepoint corresponding to the aperiodic SRS resource triggering request field, to trigger SRS of a group of terminal devices in enhanced manner.

In some embodiments, when the SRS is aperiodic SRS, configuring, in the antenna switching configuration combination supported by the terminal device, an SRS resource suitable for at least one usage, for the terminal device based on the capability reporting information includes: sending, based on the capability reporting information, MAC CE signaling to the terminal device, wherein the MAC CE signaling is configured to activate or update values of some codepoints in some aperiodic SRS resource trigger lists configured by RRC.

In some embodiments, configuring, in the antenna switching configuration combination supported by the terminal device, an SRS resource suitable for at least one usage, for the terminal device based on the capability reporting information further includes: sending Downlink Control Information (DCI) to the terminal device, and triggering an SRS resource set suitable for one or more usages through an aperiodic SRS resource triggering request field of the DCI, wherein the usages include antenna switching, and the SRS resource set suitable for one or more usages includes one or more SRS resource sets corresponding to a certain antenna switching configuration.

In some embodiments, sending Downlink Control Information (DCI) to the terminal device, and triggering an SRS resource set suitable for one or more usages through an aperiodic SRS resource triggering request field of the DCI, wherein the usages include antenna switching configuration, and the SRS resource set suitable for one or more usages includes one or more SRS resource sets corresponding to the antenna switching configuration includes: sending enhanced DCI2_3 to the terminal device, wherein the enhanced DCI2_3 is configured to indicate a triggering codepoint corresponding to the aperiodic SRS resource triggering request field, to trigger SRS of a group of terminal devices in enhanced manner; or sending user-grouped GC-DCI to the terminal device, wherein the GC-DCI is configured to indicate a triggering codepoint corresponding to the aperiodic SRS resource triggering request field, to trigger SRS of a group of terminal devices in enhanced manner.

In some embodiments, when the SRS is semi-persistent SRS, receiving SRS resource configuration information sent by the network device based on the capability reporting information includes: receiving Medium Access Control Control Element (MAC CE) signaling sent by the network device based on the capability reporting information, wherein the MAC CE signaling is configured to simultaneously activate or deactivate a target SRS resource set.

In some embodiments, the target SRS resource set includes an SRS resource set suitable for one or more usages, and wherein for the SRS resource set suitable for antenna switching, one or more SRS resource sets corresponding to a certain antenna switching configuration can be activated.

In some embodiments, the SRS is aperiodic SRS, and receiving SRS resource configuration information sent by the network device based on the capability reporting information includes: receiving Radio Resource Control (RRC) signaling sent by the network device, wherein the RRC signaling is not configured with a triggering parameter for an aperiodic SRS resource.

In some embodiments, receiving SRS resource configuration information sent by the network device based on the capability reporting information further includes: receiving MAC CE signaling sent by the network device based on the capability reporting information, wherein the MAC CE signaling is configured to activate or update the SRS resource suitable for antenna switching, and wherein one or more SRS resource sets are activated, and an entry value for writing a parameter in an aperiodic SRS resource trigger list for each SRS resource set is reconfigured, and wherein entry values for multiple SRS resource sets corresponding to the same antenna switching configuration of the terminal device are restricted to be the same.

In some embodiments, receiving SRS resource configuration information sent by the network device based on the capability reporting information further includes: receiving Downlink Control Information (DCI) sent by the network device, wherein an aperiodic SRS resource triggering request field of the DCI is configured to trigger configurations of aperiodic SRS resource triggers corresponding to values of different codepoints.

In some embodiments, receiving DCI sent by the network device, wherein an aperiodic SRS resource triggering request field of the DCI is configured to trigger configurations of aperiodic SRS resource triggers corresponding to values of different codepoints includes: receiving enhanced DCI2_3 sent by the network device, wherein the enhanced DCI2_3 is configured to indicate a triggering codepoint corresponding to the aperiodic SRS resource triggering request field, to trigger SRS of a group of terminal devices in enhanced manner; or receiving user-grouped GC-DCI sent by the network device, wherein the GC-DCI is configured to indicate a triggering codepoint corresponding to the aperiodic SRS resource triggering request field, to trigger SRS of a group of terminal devices in enhanced manner.

In some embodiments, when the SRS is aperiodic SRS, receiving SRS resource configuration information sent by the network device based on the capability reporting information includes: receiving MAC CE signaling sent by the network device based on the capability reporting information, wherein the MAC CE signaling is configured to activate or update values of some codepoints in some aperiodic SRS resource trigger lists configured by RRC.

In some embodiments, receiving SRS resource configuration information sent by the network device based on the capability reporting information further includes: receiving DCI sent by the network device, wherein an aperiodic SRS resource triggering request field of the DCI is configured to trigger an SRS resource set suitable for one or more usages, the usages include antenna switching, and the SRS resource set suitable for one or more usages includes one or more SRS resource sets corresponding to a specified antenna switching configuration.

In some embodiments, receiving DCI sent by the network device, wherein an aperiodic SRS resource triggering request field of the DCI is configured to trigger an SRS resource set suitable for one or more usages, the usages include antenna switching configuration, and the SRS resource set suitable for one or more usages includes one or more SRS resource sets corresponding to a specified antenna switching configuration, includes: receiving enhanced DCI2_3 sent by the network device, wherein the enhanced DCI2_3 is configured to indicate a triggering codepoint corresponding to the aperiodic SRS resource triggering request field, to trigger SRS of a group of terminal devices in enhanced manner; or receiving user-grouped GC-DCI sent by the network device, wherein the GC-DCI is configured to indicate a triggering codepoint corresponding to the aperiodic SRS resource triggering request field, to trigger SRS of a group of terminal devices in enhanced manner.

The above embodiments can be fully or partially implemented through software, hardware, firmware, or any combination thereof. When implemented using software, the embodiments can be fully or partially implemented in the form of a computer program product. The computer program product includes one or more computer programs. When the computer programs are loaded and executed on the computer, all or part of the processes or functions described in the embodiments of the present disclosure are generated. The computer can be a general-purpose computer, a dedicated computer, a computer network, or other programmable devices. The computer program can be stored in a computer-readable storage medium or transmitted from one computer-readable storage medium to another. For example, the computer program can be transmitted from a website site, a computer, a server, or a data center via wired (such as coaxial cable, optical fiber, digital subscriber line (DSL)) or wireless (such as infrared, wireless, microwave, etc.) communication, to transmit to another website, computer, server, or data center. The computer-readable storage medium can be any available medium that the computer can access, or a data storage device such as a server, a data center, etc. that integrates one or more available media. The available media can be magnetic media (such as floppy disks, hard drives, magnetic tapes), optical media (such as high-density digital video discs (DVDs)), or semiconductor media (such as solid state disks (SSDs)), etc.

Those of ordinary skill in the art can understand that the first, second, and other numerical numbers involved in the present disclosure are only for the convenience of description and differentiation, and are not used to limit the scope of embodiments of the present disclosure, but also indicate an order.

At least one in the present disclosure can also be described as one or more, where more can be two, three, four, or more, which is not limited in the present disclosure. In embodiments of the present disclosure, "first", "second", "third", "A", "B", "C", and "D" can be used to distinguish different technical features described, and the technical features described using "first", "second", "third", "A", "B", "C", and "D" are not distinguished from each other in an order or a magnitude.

The corresponding relationships shown in each table in the present disclosure can be configured or predefined. The values of the information in each table are only examples and can be configured to other values, which is not limited in the present disclosure. When configuring the correspondence between information and various parameters, it is not necessary to configure all the correspondence shown in each table. For example, in the table of the present disclosure, the correspondence shown in certain rows may not be configured. For example, appropriate deformation adjustments can be made based on the above table, such as splitting, merging, etc. The names of the parameters shown in the titles of the above tables can also use other names that can be understood by the communication device, and the values or representations of the parameters can also use other values or representations that can be understood by the communication device. When implementing the above tables, other data structures can also be used, such as arrays, queues, containers, stacks, linear tables, pointers, linked lists, trees, graphs, structures, classes, heaps, hash tables, etc.

The term predefined in the present disclosure can be understood as defined, defined in advance, stored, stored in advance, negotiated in advance, configured in advance, solidified in advance, or fired in advance.

Those of ordinary skill in the art can realize that units and algorithm steps of each example described in embodiments of the present disclosure can be implemented in electronic hardware, or a combination of computer software and electronic hardware. Whether these functions are implemented in hardware or software depends on the specific application and design constraints of the technical solution. The skilled person can use different methods to achieve the described functions for each specific application, but such achievement should not be considered as beyond the scope of the present disclosure.

Those skilled in the art can clearly understand that for the convenience and conciseness of the description, the specific working processes of the system, device, and unit described above can refer to the corresponding processes in the above method embodiments, which will not be repeated here.

The above are only specific implementations of the present disclosure, but the protection scope of the present disclosure is not limited to this. Those changes or replacements that can be easily conceived by any skilled person familiar with the technical field within the scope of the present disclosure, should be within the protection scope of the present disclosure. Therefore, the protection scope of the present disclosure should be based on the protection scope of appended claims.

Obviously, numerous modifications and variations of the present invention are possible in light of the above teachings. It is therefore to be understood that within the scope of the appended claims, the invention may be practiced otherwise than as specifically described herein.

What is claimed is:

1. A method for triggering a sounding reference signal (SRS) used for antenna switching, performed by a network device, the method comprising:
  - receiving capability reporting information sent by a terminal device, wherein the capability reporting information is configured to represent an antenna switching configuration combination supported by the terminal device;
  - configuring, in the antenna switching configuration combination supported by the terminal device, an SRS resource suitable for at least one usage, for the terminal device, wherein the at least one usage comprises antenna switching; and
  - sending, based on the capability reporting information, SRS resource configuration information to the terminal device, wherein the SRS resource configuration information comprises information for activating the SRS resource used for uplink SRS;
  - wherein the SRS resource suitable for antenna switching is configured within the same Bandwidth Part (BWP) by using Radio Resource Control (RRC) signaling, the SRS resource suitable for antenna switching comprises an SRS resource set for different antenna switching configurations that the terminal device can support, and each antenna switching configuration corresponds to one or more SRS resource sets.

2. The method according to claim 1, wherein the SRS is a semi-persistent SRS, and sending, based on the capability reporting information, the SRS resource configuration information to the terminal device comprises:
  - sending, based on the capability reporting information, Medium Access Control Control Element (MAC CE) signaling to the terminal device to trigger the semi-persistent SRS, wherein the MAC CE signaling is configured to simultaneously activate or deactivate a target SRS resource set.

3. The method according to claim 2, wherein the target SRS resource set comprises an SRS resource set suitable for one or more usages, and wherein for the SRS resource set suitable for antenna switching, one or more SRS resource sets corresponding to a certain antenna switching configuration can be activated.

4. The method according to claim 1, wherein the SRS is an aperiodic SRS, and sending, based on the capability reporting information, the SRS resource configuration information to the terminal device comprises:

sending RRC signaling to the terminal device, wherein the RRC signaling is not configured with a triggering parameter for an aperiodic SRS resource.

5. The method according to claim 4, wherein sending, based on the capability reporting information, the SRS resource configuration information to the terminal device further comprises:

sending, based on the capability reporting information, MAC CE signaling to the terminal device, wherein the MAC CE signaling is configured to activate or update the SRS resource suitable for antenna switching, and wherein one or more SRS resource sets are activated, and an entry value for writing a parameter in an aperiodic SRS resource trigger list for each SRS resource set is reconfigured, and wherein entry values for multiple SRS resource sets corresponding to the same antenna switching configuration of the terminal device are restricted to be the same.

6. The method according to claim 5, wherein sending, based on the capability reporting information, the SRS resource configuration information to the terminal device further comprises:

sending Downlink Control Information (DCI) to the terminal device, and triggering configurations of aperiodic SRS resource triggers corresponding to values of different codepoints through an aperiodic SRS resource triggering request field of the DCI.

7. The method according to claim 5, wherein sending, based on the capability reporting information, the SRS resource configuration information to the terminal device further comprises:

sending enhanced DCI2_3 to the terminal device, wherein the enhanced DCI2_3 is configured to indicate a triggering codepoint corresponding to an aperiodic SRS resource triggering request field, to trigger the SRS of a group of terminal devices in enhanced manner; or sending user-grouped Group Common Downlink Control Information (GC-DCI) to the terminal device, wherein the GC-DCI is configured to indicate the triggering codepoint corresponding to the aperiodic SRS resource triggering request field, to trigger the SRS of a group of terminal devices in enhanced manner.

8. The method according to claim 1, wherein the SRS is an aperiodic SRS, and sending, based on the capability reporting information, the SRS resource configuration information to the terminal device comprises:

sending, based on the capability reporting information, MAC CE signaling to the terminal device, wherein the MAC CE signaling is configured to activate or update values of some codepoints in some aperiodic SRS resource trigger lists configured by RRC.

9. The method according to claim 8, wherein sending, based on the capability reporting information, the SRS resource configuration information to the terminal device further comprises:

sending DCI to the terminal device, and triggering an SRS resource set suitable for one or more usages through an aperiodic SRS resource triggering request field of the DCI, wherein the usages comprise antenna switching, and the SRS resource set suitable for one or more usages comprises one or more SRS resource sets corresponding to a certain antenna switching configuration; or sending enhanced DCI2_3 to the terminal device, wherein the enhanced DCI2_3 is configured to indicate a triggering codepoint corresponding to the aperiodic SRS resource triggering request field, to trigger the SRS of a group of terminal devices in enhanced manner; or sending user-grouped GC-DCI to the terminal device, wherein the GC-DCI is configured to indicate the triggering codepoint corresponding to the aperiodic SRS resource triggering request field, to trigger the SRS of a group of terminal devices in enhanced manner.

10. A non-transitory computer-readable storage medium for storing instructions, which when executed cause the method according to claim 1 to be implemented.

11. A method for triggering a sounding reference signal (SRS) used for antenna switching, performed by a terminal device, the method comprising:

sending capability reporting information to a network device, wherein the capability reporting information is configured to represent an antenna switching configuration combination supported by the terminal device;

receiving SRS resource configuration information sent by the network device based on the capability reporting information, wherein the SRS resource configuration information comprises information for activating an SRS resource used for uplink SRS; and sending, based on the SRS resource configuration information and the capability reporting information, the uplink SRS to the network device;

wherein the SRS resource is suitable for antenna switching and is configured within the same Bandwidth Part (BWP) by using Radio Resource Control (RRC) signaling, the SRS resource suitable for antenna switching comprises an SRS resource set for different antenna switching configurations that the terminal device can support, and each antenna switching configuration corresponds to one or more SRS resource sets.

12. The method according to claim 11, wherein the SRS is a semi-persistent SRS, and receiving the SRS resource configuration information sent by the network device based on the capability reporting information comprises:

receiving Medium Access Control Control Element (MAC CE) signaling sent by the network device based on the capability reporting information, wherein the MAC CE signaling is configured to simultaneously activate or deactivate a target SRS resource set.

13. The method according to claim 12, wherein the target SRS resource set comprises an SRS resource set suitable for one or more usages, and wherein for the SRS resource set suitable for antenna switching, one or more SRS resource sets corresponding to a certain antenna switching configuration can be activated.

14. The method according to claim 11, wherein the SRS is an aperiodic SRS, and receiving the SRS resource configuration information sent by the network device based on the capability reporting information comprises:

receiving RRC signaling sent by the network device, wherein the RRC signaling is not configured with a triggering parameter for an aperiodic SRS resource.

15. The method according to claim 14, wherein receiving the SRS resource configuration information sent by the network device based on the capability reporting information further comprises:

receiving MAC CE signaling sent by the network device based on the capability reporting information, wherein the MAC CE signaling is configured to activate or update the SRS resource suitable for antenna switching, and wherein one or more SRS resource sets are activated, and an entry value for writing a parameter in an aperiodic SRS resource trigger list for each SRS resource set is reconfigured, and wherein entry values for multiple SRS resource sets corresponding to the same antenna switching configuration of the terminal device are restricted to be the same.

16. The method according to claim 15, wherein receiving the SRS resource configuration information sent by the network device based on the capability reporting information further comprises:

receiving Downlink Control Information (DCI) sent by the network device, wherein an aperiodic SRS resource triggering request field of the DCI is configured to trigger configurations of aperiodic SRS resource triggers corresponding to values of different codepoints; or receiving enhanced DCI2_3 sent by the network device, wherein the enhanced DCI2_3 is configured to indicate a triggering codepoint corresponding to the aperiodic SRS resource triggering request field, to trigger the SRS of a group of terminal devices in enhanced manner; or receiving user-grouped Group Common Downlink Control Information (GC-DCI) sent by the network device, wherein the GC-DCI is configured to indicate the triggering codepoint corresponding to the aperiodic SRS resource triggering request field, to trigger the SRS of a group of terminal devices in enhanced manner.

17. The method according to claim 11, wherein the SRS is an aperiodic SRS, and receiving the SRS resource configuration information sent by the network device based on the capability reporting information comprises:

receiving MAC CE signaling sent by the network device based on the capability reporting information, wherein the MAC CE signaling is configured to activate or update values of some codepoints in some aperiodic SRS resource trigger lists configured by RRC.

18. The method according to claim 17, wherein receiving the SRS resource configuration information sent by the network device based on the capability reporting information further comprises:

receiving DCI sent by the network device, wherein an aperiodic SRS resource triggering request field of the DCI is configured to trigger an SRS resource set suitable for one or more usages, the usages comprise antenna switching, and the SRS resource set suitable for one or more usages comprises one or more SRS resource sets corresponding to a specified antenna switching configuration; or receiving enhanced DCI2_3 sent by the network device, wherein the enhanced DCI2_3 is configured to indicate a triggering codepoint corresponding to the aperiodic SRS resource triggering request field, to trigger the SRS of a group of terminal devices in enhanced manner; or receiving user-grouped GC-DCI sent by the network device, wherein the GC-DCI is configured to indicate the triggering codepoint corresponding to the aperiodic SRS resource triggering request field, to trigger the SRS of a group of terminal devices in enhanced manner.

19. A communication device, comprising a processor and a memory for storing a computer program, wherein the processor is configured to execute the computer program stored in the memory to cause the method according to claim 11 to be implemented.

20. A communication device, comprising a processor and a memory for storing a computer program, wherein the processor is configured to:

receive capability reporting information sent by a terminal device, wherein the capability reporting information is configured to represent an antenna switching configuration combination supported by the terminal device;

configure, in the antenna switching configuration combination supported by the terminal device, an SRS resource suitable for at least one usage, for the terminal device, wherein the at least one usage comprises antenna switching; and send, based on the capability reporting information, SRS resource configuration information to the terminal device, wherein the SRS resource configuration information comprises information for activating the SRS resource used for uplink SRS;

wherein the SRS resource suitable for antenna switching is configured within the same Bandwidth Part (BWP) by using Radio Resource Control (RRC) signaling, the SRS resource suitable for antenna switching comprises an SRS resource set for different antenna switching configurations that the terminal device can support, and each antenna switching configuration corresponds to one or more SRS resource sets.

* * * * *